United States Patent [19]

Tagawa

[11] Patent Number: 4,843,502
[45] Date of Patent: Jun. 27, 1989

[54] MAGNETIC HEAD SLIDER LOADING MECHANISM FOR MAGNETIC DISK APPARATUS

[75] Inventor: Norio Tagawa, Tokyo, Japan
[73] Assignee: NEC Corporation, Tokyo, Japan
[21] Appl. No.: 112,926
[22] Filed: Oct. 27, 1987

[30] Foreign Application Priority Data

Oct. 27, 1986 [JP] Japan ................... 61-255481

[51] Int. Cl.$^4$ ............... G11B 5/592; G11B 21/12; G11B 21/21
[52] U.S. Cl. ................... 360/105; 360/75; 360/103
[58] Field of Search ............ 360/105, 75, 103

[56] References Cited

U.S. PATENT DOCUMENTS

| | | | |
|---|---|---|---|
| 4,167,765 | 9/1979 | Watrous | 360/103 |
| 4,218,715 | 8/1980 | Garnier | 360/103 |
| 4,651,242 | 3/1987 | Hirano et al. | 360/103 |

FOREIGN PATENT DOCUMENTS 59-3745  1/1984  Japan ................... 360/103

Primary Examiner—Robert S. Tupper
Attorney, Agent, or Firm—Sughrue, Mion, Zinn, Macpeak & Seas

[57] ABSTRACT

Structure for maintaining a magnetic head at a constant flying height over a magnetic disk surface. Electromechanical transducers cooperate with structure of a negative pressure head slider mechanism to keep the slider out of contact with the magnetic disk when the disk is not rotating, and to move the head to within a constant flying height over the disk surface when the disk is rotating at a sufficient constant speed. The structure of the negative pressure head slider may be such as to maintain the slider at the constant flying height even when drive voltage is not applied to the transducers, so long as the magnetic disk is rotating at a constant speed.

9 Claims, 2 Drawing Sheets

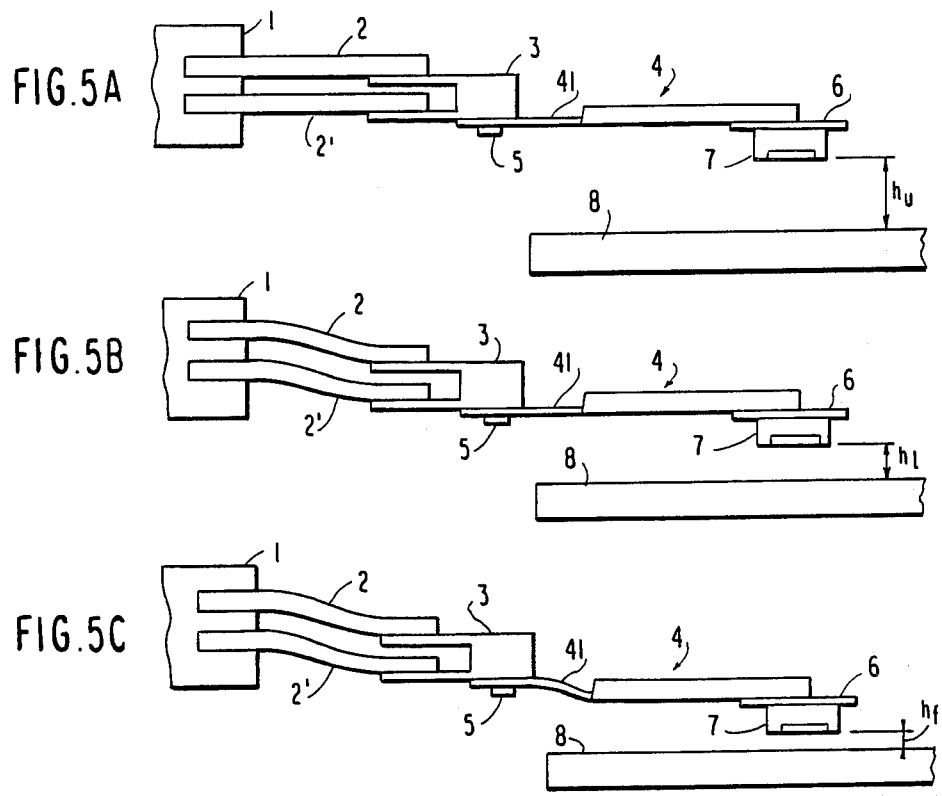
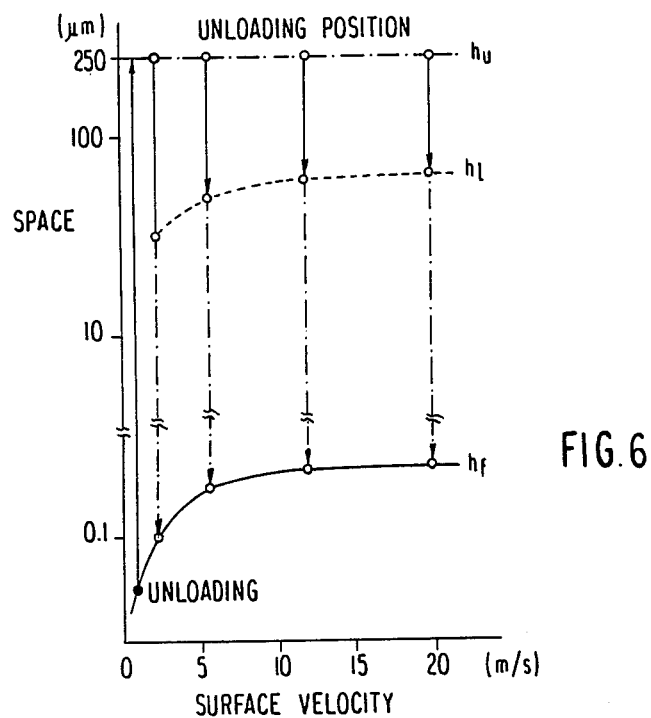

MAGNETIC HEAD SLIDER LOADING MECHANISM FOR MAGNETIC DISK APPARATUS

BACKGROUND OF THE INVENTION

The present invention relates to a magnetic head slider loading mechanism which moves a magnetic head slider in a direction perpendicular to a surface of a magnetic disk, and more particularly, to a magnetic head slider loading mechanism suitable to load a negative pressure head slider.

A magnetic head slider loading mechanism of this kind takes a negative pressure head slider out of contact with a surface of a magnetic disk when the magnetic disk is not rotating. When the magnetic disk starts rotating at a constant rotation speed, the magnetic head slider loading mechanism moves the head slider toward the disk surface at a position where the negative pressure head slider is subjected to a negative pressure force generated by a air flow of the disk rotation. Thereafter, the head slider flies on the disk surface while maintaining a constant flying height during a transducing operation to the magnetic disk.

A conventional head slider loading mechanism is disclosed in U.S. Pat. No. 4,286,297 issued to Root et al. The loading mechanism includes a box-like arm structure which supports a suspension of the negative pressure head slider. The head slider contacts a boss formed on a rectangular lid which covers an opening of the box-like arm structure. The box-like arm structure is further provided with a slot at one side wall for allowing air passage into the hollow interior of the arm structure. The air flow is generated by disk rotation and then impinges on the lid so that a load force is applied to the head slider.

In the conventional loading mechanism, the load force is not stable and is difficult to control accurately since the air flow is utilized by the load force. Additionally, the loading mechanism has a complicated structure for transmitting the pressure of the air flow into the load force applied to the head slider.

SUMMARY OF THE INVENTION

Therefore, an object of the present invention is to provide a magnetic head slider loading mechanism capable of stably and accurately loading the head slider to a magnetic disk.

Another object of the present invention is to provide a magnetic head slider loading mechanism having a simple structure.

A magnetic head loading mechanism according to the present invention includes a suspension for supporting a negative pressure head slider at its one longitudinal end and a bimorph electromechanical transducer for supporting the other longitudinal end of the suspension element. The bimorph electromechanical transducer is bent by drive voltage applied thereto so as to move the magnetic head toward the megnetic disk at the position where the head slider is subjected to a negative pressure force generated by air flow caused by disk rotation.

BRIEF DESCRIPTION OF THE DRAWINGS

FIGS. 5A to 5C are side views showing an operation of the head loading mechanism shown in FIG. 1.

FIG. 6 shows relationship between a surface velocity of a magnetic disk and spacing of the head slider shown in FIGS. 3 and 4.

DESCRIPTION OF THE PREFERRED EMBODIMENT

Figure 1:
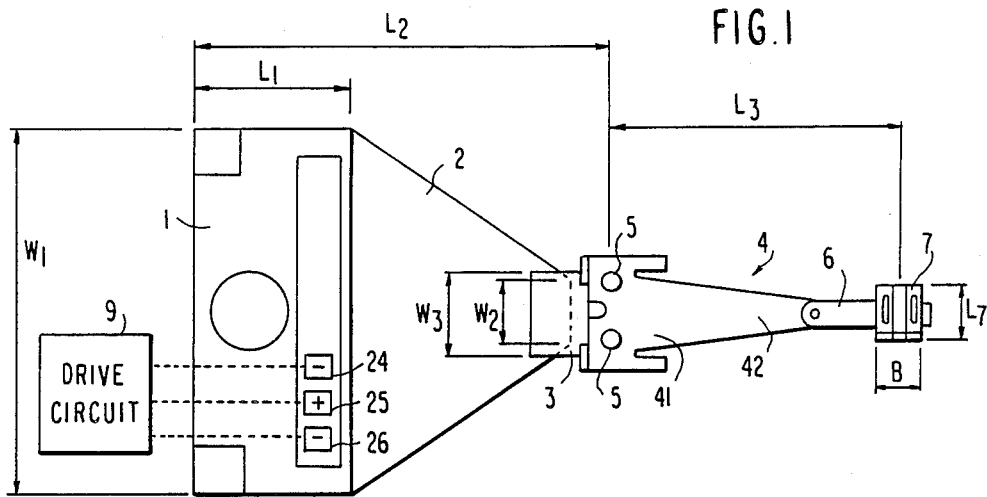
FIG. 1 is a plan view of a head loading mechanicm according to an embodiment of the present invention.
Figure 2:
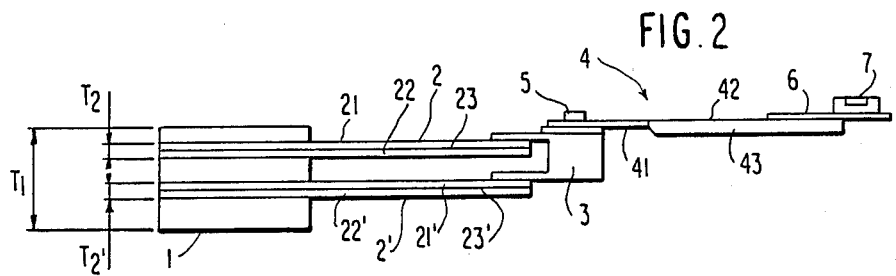
FIG. 2 is a side view of the head loading mechanism shown in FIG. 1.

With reference to FIGS. 1 and 2, a magnetic head arm assembly according to an embodiment of the present invention comprises a mount block 1 which supports fixed ends of a pair of bimorph electromechanical transducers 2 and 2' in parallel. The mount block 1 is attached to an arm of a head positioning actuator which moves a magnetic head in a radial direction of a magnetic disk as is well known in the art.

Each of the transducers 2 and 2' is made up of a pair of piezoelectric elements 21 (21') and 22 (22') and a flexible resin plate 23 (23') sandwiched therebetween. Such a structure of the bimorph transducer 2 is well known as disclosed in U.S. Pat. No. 4,594,526, for instance. Upper electrodes of the piezoelectric elements 21 and 21' are electrically combined and connected to an electrode terminal 24. Lower electrodes of the elements 21 and 21' and upper electrodes of the elements 22 and 22' are combined and connected to a terminal 25. Lower electrodes of the elements 22 and 22' are combined and connected to a terminal 26. The bimorph transducers 2 and 2' are energized by a drive circuit 9.

Free ends of the bimorph transducers 2 and 2' are fixedly secured by a binder 3 which is made of a complex resin including carbon fibers. Thus, the pair of the transducers 2 and 2' always are parallel to each other. A suspension element 4 made of stainless steel is fixed at one longitudinal end to the binder 3 by a pair of screws 5. The suspension element 4 has a resilient spring section 41, and a load beam section 42 which is made rigid by flanges 43. A flexure element 6 is fastened to the suspension element 4 at its load beam section 42 by welding. The flexure element 6 supports a negative pressure head slider 7 at its one end. Such a structure consisting of the suspension element 4, flexure element 6 and the head slider 7 is substantially the same as the structure disclosed in U.S. Pat. No. 4,167,765.

In detail, the length $L_1$, width $W_1$ and thickness $T_1$ of the mount block 1 are 11 mm, 26 mm and 5.6 mm, respectively. The length $L_2$ from the one end of the bimorph transducer 2 to the screws 5 is 32.5 mm. The width $W_2$ of the other end of the transducer 2 is 5 mm. The thicknesses $T_2$ and $T_2'$ of the transducers 2 and 2' are 0.5 mm. The width $W_3$ of the binder 3 is 8 mm. The length $L_3$ from the screw 5 to the center of the slider 7 is 20.2 mm.

Figure 3:
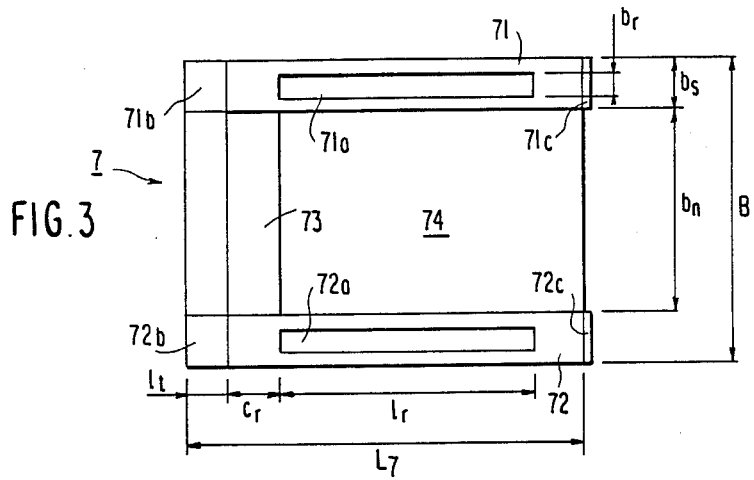
FIG. 3 is a plan view of a head slider used in the head loading mechanism shown in FIG. 1.
Figure 4:
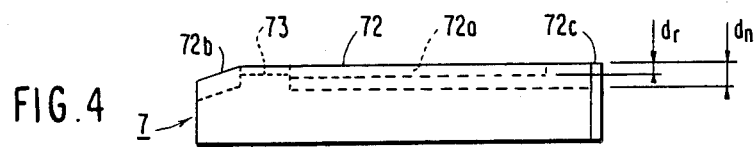
FIG. 4 is a side view of the head slider shown in FIG. 3.

Referring to FIGS. 3 and 4, the negative pressure head slider 7 has a pair of side rails 71 and 72, a cross-rail 73 and a negative pressure zone 74. The surfaces of the side rails 71 and 72 are provided with recessed portions 71a and 72a, respectively. The leading portions of the rails 71 and 72 are formed with tapered sections 71b and 72b and the trailing portions thereof are provided with magnetic transducers 71c and 72c. Such a negative pressure head slider is disclosed in U.S. Pat. No. 4,218,715 and the description of the characteristics thereof is omitted.

The head slider 7 has a width B and length $L_7$ of 3.1 mm and 4 mm, respectively. Each of the rails 71 and 72 has a width $b_s$ of 0.55 mm and the cross-rail 73 has a width $c_r$ of 0.55 mm. The negative pressure zone 74 has a width $b_n$ and a depth $d_n$ of 2 mm and 10 μm, respectively. The length $l_r$, width $b_r$ and depth $d_r$ of the recessed portions 71a and 72a are 2.5 mm, 0.25 mm and 0.2 μm, respectively. The length $l_t$ of the tapered portions 71b and 72b is 0.4 mm.

The operation of the magnetic head loading mechanism will be described with reference to FIGS. 5A to 5C.

When a magnetic disk 8 is not rotating, the head slider 7 is out of contact and in nontransducing relation with the magnetic disk 8 as shown in FIG. 5A. In the unloading state, a space $h_u$ is about 250 μm. When the magnetic disk 8 starts rotating and its surface speed becomes about 20 m/s, the bimorph transducers 2 and 2' are energized by the drive circuit 9 with a drive voltage of about 70 to 80 volts applied to the terminal 25. The transducers 2 and 2' are bent toward the surface of the magnetic disk 8 with a displacement of about 200 μm so that the space $h_l$ becomes about 50 μm. Since the free ends of the transducers 2 and 2' are connected by the binder 3, the suspension element 4 and the head slider 7 moves downward while maintaining a parallel relationship to the surface of the disk 8 as shown in FIG. 5B.

When the space $h_l$ becomes 50 μm, the negative pressure head slider 7 is subjected to a negative pressure force (absorbing force to the disk surface) due to the air flow generated by the disk rotation. The negative pressure force enables the head slider 7 to move further toward the disk surface so that the suspension element 4 is bent toward the disk surface at its resilient spring section 41. When the negative pressure force and a positive pressure force applied to the head slider 7 are in balance, the head slider 7 maintains a parallel relationship to the disk surface with a constant flying height $h_f$ of about 0.2 μm as shown in FIG. 5C. In this state, the magnetic transducer 71c or 72c carries out the transducing operation to the magnetic disk 8.

After the transducing operation is completed and the magnetic disk 8 stops rotating, the voltage to the bimorph transducers 2 and 2' is cut off. In response to the decrease of the surface speed of the disk 8, the negative pressure force (absorbing force) applied to the head slider 7 is decreased. When the negative pressure force is smaller than the restoration force of the suspension element 4, the head slider 7 returns to the unloading position (FIG. 5A).

FIG. 6 shows a relationship among the surface velocity of the magnetic disk 8, the space $h_l$ where the negative pressure head slider 7 is subjected to the negative pressure force and the flying height $h_f$ of the head slider 7. As is apparent from FIG. 6, the space $h_l$ and the flying height $h_f$ are decreased in accordance with the decrease of the surface velocity. Accordingly, much displacement of the bimorph transducer 2 is required when the surface velocity is lower. FIG. 6 also shows that the head slider 7 is returned to the unloading position $h_u$ when the surface velocity is less than about 1 m/s.

In the head loading mechanism according to the present invention, the problem of head sticking and friction between the head and the disk are eliminated since the head is not in contact with the disk during start and stop. Since the loading mechanism uses a bimorph electromechanical transducer to cause a head slider to move from the unloading to the loading position, the loading force is controllable by the voltage applied to the electromechanical transducer. In addition, the conventional suspension element can be used in the loading mechanism and the manufacturing cost thereof is cheap.

In the preferred embodiment, the bimorph transducers 2 and 2' are energized while the rotational speed of the magnetic disk 8 is constant. However, the drive voltage may be cut off after the head slider 7 is in a transducing relation with the magnetic disk 8, i.e., after the flying height of the head slider 7 is $h_f$. In this case, the deflection of the suspension element 4 is increased and the head slider 7 keeps its flying height only by the negative and positive pressure force generated by the air flow of the disk rotation.

What is claimed is:

1. A magnetic head loading mechanism comprising:
   a negative pressure head slider including an air bearing surface facing a surface of a magnetic disk, said negative pressure head slider being subjected to a first force so as to cause the slider to move toward said surface of said magnetic disk by an air flow generated by the rotation of said magnetic disk when a space between said air bearing surface and the magnetic disk surface is less than a first value;
   a suspension element for supporting said negative pressure head slider above said magnetic disk surface at one end;
   a pair of bimorph electromechanical transducers, provided substantially parallel to said magnetic disk surface;
   a mount member for supporting said bimorph electromechanical transducers at respective fixed ends so as to be substantially parallel to each other;
   a binder member connected to respective free ends of said bimorph electromechanical transducers, the other end of said suspension element being fixed only to said binder member so that said air bearing surface of said negative pressure lead slider is substantially parallel to said magnetic disk surface; and
   drive means for applying a drive voltage to said bimorph electromechanical transducers so as to move said negative pressure head slider in a direction substantially perpendicular to said magnetic disk surface;
   said bimorph electromechanical transducers holding said negative pressure head slider at an unloading position where said space is greater than said first value when said drive voltage is not applied, and said bimorph electromechanical transducers moving said negative pressure head slider to a loading position where said space is less than said first value while maintaining said air beaming surface of said negative pressure head slider substantially parallel to said magnetic disk surface when said drive voltage is applied.

2. A magnetic head loading mechanism as claimed in claim 1, wherein said negative pressure head slider is subjected to a second force so as to cause the slider to move away from said magnetic disk surface by said air flow when said space is less than a second value which is less than said first value, said suspension element enabling said negative pressure head slider to have a constant flying height relative to said magnetic disk surface at a position where said first and second forces are in balance.

3. A magnetic head loading mechanism as claimed in claim 1, wherein said suspension element includes a resilient section and a rigid beam section, said resilient section being bent by said first force generated by said negative pressure head slider after said bimorph electromechanical transducers moves said negative pressure head to said loading position so as to enable said negative pressure head slider to have a constant flying height relative to said magnetic disk surface.

4. A magnetic head loading mechanism as claimed in claim 1, wherein said drive means applies said drive voltage while said magnetic disk is rotating at a constant speed.

5. A magnetic head loading mechanism as claimed in claim 1, wherein said first and second bimorph electromechanical transducers have substantially equal drive voltage applied thereto.

6. A magnetic head loading mechanism as claimed in claim 1, wherein said first force is sufficient to maintain said negative pressure head slider at a position where said space is less than said first value when said drive voltage is not applied and said magnetic disk is rotating at a constant speed.

7. A magnetic head loading mechanism as claimed in claim 1, wherein said binder comprises a complex resin including carbon fibers.

8. A magnetic head loading mechanism as claimed in claim 1, wherein said suspension element comprises stainless steel.

9. A magnetic head loading mechanism as claimed in claim 3, wherein said first value is substantially equal to 50 $\mu$m, and said constant flying height is substantially equal to 0.2 $\mu$m.

* * * * *

UNITED STATES PATENT AND TRADEMARK OFFICE
CERTIFICATE OF CORRECTION

PATENT NO. : 4,843,502

DATED : June 27, 1989

INVENTOR(S) : Norio Tagawa

It is certified that error appears in the above-identified patent and that said Letters Patent is hereby corrected as shown below:

Column 1, line 60, delete "megnetic" and insert therefor --magnetic--.

Column 5, line 12, after "said" delete "First and second".

Signed and Sealed this

Fourth Day of September, 1990

Attest:

HARRY F. MANBECK, JR.

*Attesting Officer*    *Commissioner of Patents and Trademarks*